(12) United States Patent
Moser et al.

(10) Patent No.: US 12,169,020 B2
(45) Date of Patent: Dec. 17, 2024

(54) METHOD AND CONTROL APPARATUS FOR OPERATING A POSITIVE SHIFT ELEMENT OF A TRANSMISSION OF A VEHICLE, TRANSMISSION AND VEHICLE

(71) Applicant: ZF Friedrichshafen AG, Friedrichshafen (DE)

(72) Inventors: Wilhelm Moser, Oberteuringen (DE); Alain Tierry Chamaken Kamde, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/512,699

(22) Filed: Nov. 17, 2023

(65) Prior Publication Data
US 2024/0167564 A1 May 23, 2024

(30) Foreign Application Priority Data

Nov. 18, 2022 (DE) ...................... 10 2022 212 307.7

(51) Int. Cl.
*F16H 61/04* (2006.01)

(52) U.S. Cl.
CPC . *F16H 61/0403* (2013.01); *F16H 2061/0422* (2013.01); *F16H 2061/047* (2013.01)

(58) Field of Classification Search
CPC ......... F16H 61/0403; F16H 2061/0422; F16H 2061/047
USPC .......................................................... 701/51
See application file for complete search history.

(56) References Cited

U.S. PATENT DOCUMENTS

| | | | |
|---|---|---|---|
| 6,785,599 B2 | 8/2004 | Berger et al. | |
| 8,647,237 B2 | 2/2014 | Prix et al. | |
| 10,259,320 B1* | 4/2019 | Reich | F16H 63/486 |
| 10,272,765 B1* | 4/2019 | Cho | B60K 6/543 |
| 2004/0195071 A1* | 10/2004 | Khaykin | F16H 61/22 |
| | | | 192/220.2 |
| 2019/0072168 A1* | 3/2019 | Yamamura | B60K 1/00 |

(Continued)

FOREIGN PATENT DOCUMENTS

| | | |
|---|---|---|
| DE | 10 2010 039 445 A1 | 2/2012 |
| DE | 10 2017 222 436 A1 | 6/2019 |

(Continued)

OTHER PUBLICATIONS

German Patent Office, Office Action issued in German patent application No. 10 2022 212 304.2 (Jul. 19, 2023).

(Continued)

*Primary Examiner* — Colby M Hansen
(74) *Attorney, Agent, or Firm* — Finch & Maloney PLLC

(57) ABSTRACT

Disclosed is a method for operating an interlocking shifting element of a transmission of a vehicle, where the interlocking shifting element has shifting element halves which can be moved relative to one another when opening and closing the interlocking shifting element. An electric actuator is arranged to bring about the relative movement between the shifting element halves when opening and/or closing the interlocking shifting element. An electric current strength through the electric actuator is determined and, depending on the electric current strength through the electric actuator, a conclusion is reached about the shifting position of the interlocking shifting element.

12 Claims, 1 Drawing Sheet

(56) References Cited

U.S. PATENT DOCUMENTS

| | | | |
|---|---|---|---|
| 2019/0178361 A1* | 6/2019 | Cho | F16H 48/36 |
| 2020/0331336 A1* | 10/2020 | Kaltenbach | B60K 6/442 |
| 2021/0260995 A1* | 8/2021 | Akiyama | B60K 17/08 |
| 2021/0372506 A1* | 12/2021 | McGrew, Jr. | F16H 3/725 |

FOREIGN PATENT DOCUMENTS

| | | |
|---|---|---|
| WO | 197 23 393 A1 | 12/1997 |
| WO | 10 2019 219 957 B3 | 5/2021 |

OTHER PUBLICATIONS

German Patent Office, Office Action issued in German patent application No. 10 2022 212 307.7 (Jul. 17, 2023).

\* cited by examiner

METHOD AND CONTROL APPARATUS FOR OPERATING A POSITIVE SHIFT ELEMENT OF A TRANSMISSION OF A VEHICLE, TRANSMISSION AND VEHICLE

RELATED APPLICATIONS

This application claims the benefit of and right of priority under 35 U.S.C. § 119 to German Patent Application no. 10 2022 212 307.7, filed on 18 Nov. 2022, the contents of which are incorporated herein by reference in its entirety.

FIELD OF THE DISCLOSURE

The invention relates to a method for operating an interlocking shifting element of a transmission of a vehicle. The invention further relates to a control unit for operating an interlocking shifting element of a transmission of a vehicle, a transmission with such a control unit, and a vehicle with such a transmission.

BACKGROUND

A drivetrain of a vehicle comprises, besides a drive unit, a transmission connected between the drive unit and a drive output. The transmission transforms rotation speeds and torques and transmits the traction force generated by the drive unit to the drive output.

In a hybrid vehicle the drive unit comprises an internal combustion engine and an electric machine. In a fully electric vehicle, also referred to simply as an electric vehicle, the drive unit comprises exclusively at least one electric machine.

The transmission of a vehicle comprises shifting elements. In each frictional gear of the transmission, a first number of shifting elements are closed and a second number of shifting elements are open. To carry out a gearshift from a current gear to a target gear, at least one shifting element which is closed in the current gear, is opened and at least one shifting element which is open in the current gear, is closed.

In a transmission of a vehicle, all the shifting elements can be in the form of frictional shifting elements such as brakes or clutches, and/or interlocking shifting elements, such as claws. During the opening and/or closing of an interlocking shifting element, tooth-on-tooth positions or tooth-on-tooth clashes can occur, which prevent an interlocking shifting element from being able to be fully closed.

To enable the proper operation of a transmission with an interlocking shifting element, it is necessary to determine reliably the shifting position of the interlocking shifting element, i.e., for example to determine whether the shifting position is such that there is a tooth-on-tooth position at the interlocking shifting element.

According to the prior art, to determine the shifting position of an interlocking shifting element a position sensor is required, which determines the shifting position of the interlocking shifting element by measurement-technology means.

DE 10 2010 039 445 A1 discloses various shifting elements of a transmission, such as frictional shifting elements and interlocking shifting elements. It is known that to open and close an interlocking shifting element, shifting element halves of the shifting element are displaced relative to one another by an electric actuator. The electric actuator can be, for example, an electric motor.

SUMMARY

There is need for a method for operating an interlocking shifting element of a transmission of a vehicle, and a control unit for operating an interlocking shifting element of a transmission of a vehicle, which enables a shifting position of the interlocking shifting element to be determined even without a position sensor.

Starting from there, the purpose of the present invention is to provide a new type of method and control unit for operating an interlocking shifting element of a transmission of a vehicle, a transmission with such a control unit, and a vehicle with such a transmission.

This objective is achieved with a method disclosed herein. According to the invention, the strength of the electric current through the electric actuator functionally connected to the interlocking shifting element is detected and, depending on the strength of the current in the electric actuator, a conclusion is drawn about the shifting position of the interlocking shifting element.

With the present invention it is proposed for the first time to determine the shifting position of an interlocking shifting element on the basis of the strength of the electric current through an electric actuator of an interlocking shifting element. There is then no need for a position sensor. The method can also be used to verify the shifting position determined by means of a position sensor.

The strength of the electric current in the electric actuator corresponds to the strength of the electric current flowing through the electric actuator. The electric current strength can be measured or, in particular, calculated from a measured electrical voltage.

Preferably, when the strength of the electric current in the electric actuator exceeds a limit value, it can be concluded that the interlocking shifting element is either at a tooth-on-tooth position or at an end position of the interlocking shifting element. In that way it can be concluded simply and reliably that the interlocking shifting element is in a tooth-on-tooth position or at an end position.

Preferably, if it is recognized before the lapse of a defined time interval after the beginning of the activation of the interlocking shifting element by the electric actuator that the electric current strength through the electric actuator is larger than the said limit value, then it can be concluded that the shifting position of the interlocking shifting element is a tooth-on-tooth position of the interlocking shifting element. This procedure is preferred for determining whether an interlocking shifting element is at a tooth-on-tooth position.

Preferably, if it is recognized after the lapse of a defined time interval after the beginning of the activation of the interlocking shifting element by the electric actuator that the electric current strength of the electric actuator is larger than the said limit value, then it can be concluded that the shifting position of the interlocking shifting element is an end position of the interlocking shifting element. This procedure is preferred for determining whether an interlocking shifting element is at an end position.

The present disclosure is also directed to control unit.
The present disclosure is also directed to a transmission.
The present disclosure is further directed to a vehicle.

BRIEF DESCRIPTION OF THE DRAWINGS

Preferred further developments emerge from the following description. Example embodiments of the invention, to which it is not limited, are explained in greater detail with reference to the drawings, which show.

DETAILED DESCRIPTION

Figure 1:
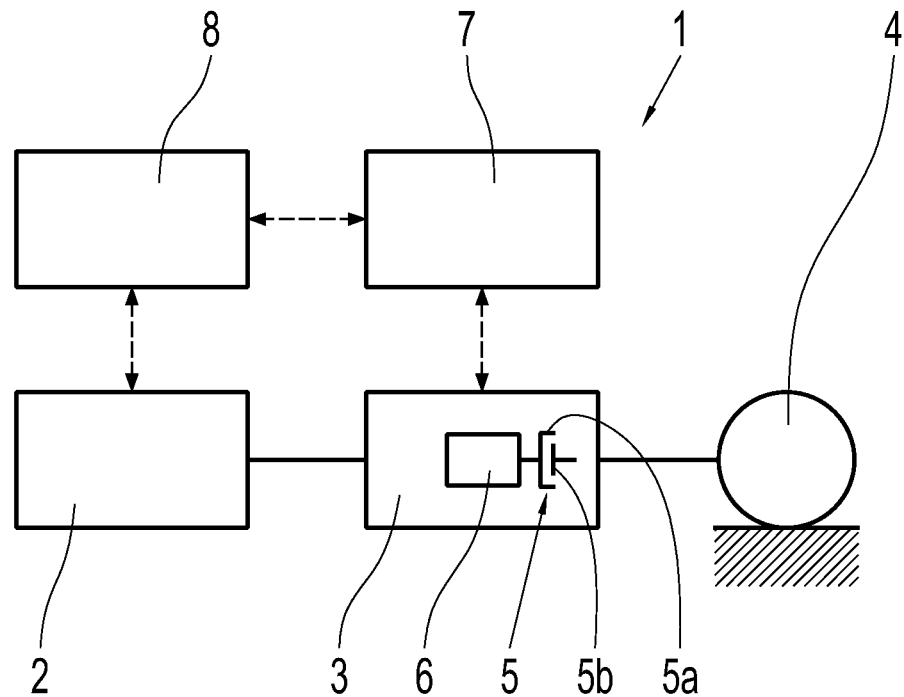
FIG. 1: A block diagram of a drivetrain scheme of a vehicle in the form of an electric vehicle.

FIG. 1 shows, very schematically, a drivetrain 1 of an electric vehicle. The drivetrain 1 comprises an electric machine 2 and a transmission 3 connected between the electric machine 2 and a drive output 4.

The transmission 3 transforms rotation speeds and torques and transmits the traction force generated by the electric machine 2 to the drive output 4.

FIG. 1 shows, as an assembly of the transmission 3, an interlocking shifting element 5, in particular in the form of a claw. The interlocking shifting element 5 has shifting element halves 5a and 5b which, to open and close the interlocking shifting element 5, can be moved relative to one another. This is done by an electric actuator, which brings about a relative movement between the shifting element halves 5a, 5b in order to open and close the interlocking shifting element.

FIG. 1 also shows a transmission control unit 7 and a motor control unit 8. The transmission control unit 7 controls and/or regulates the operation of the transmission 3, and for that purpose exchanges data with the transmission 3. The motor control unit 8 controls and/or regulates the operation of the electric machine 2 and for that purpose exchanges data with the electric machine 2. Furthermore, the motor control unit 8 and the transmission control unit 7 exchange data with one another.

Figure 2:
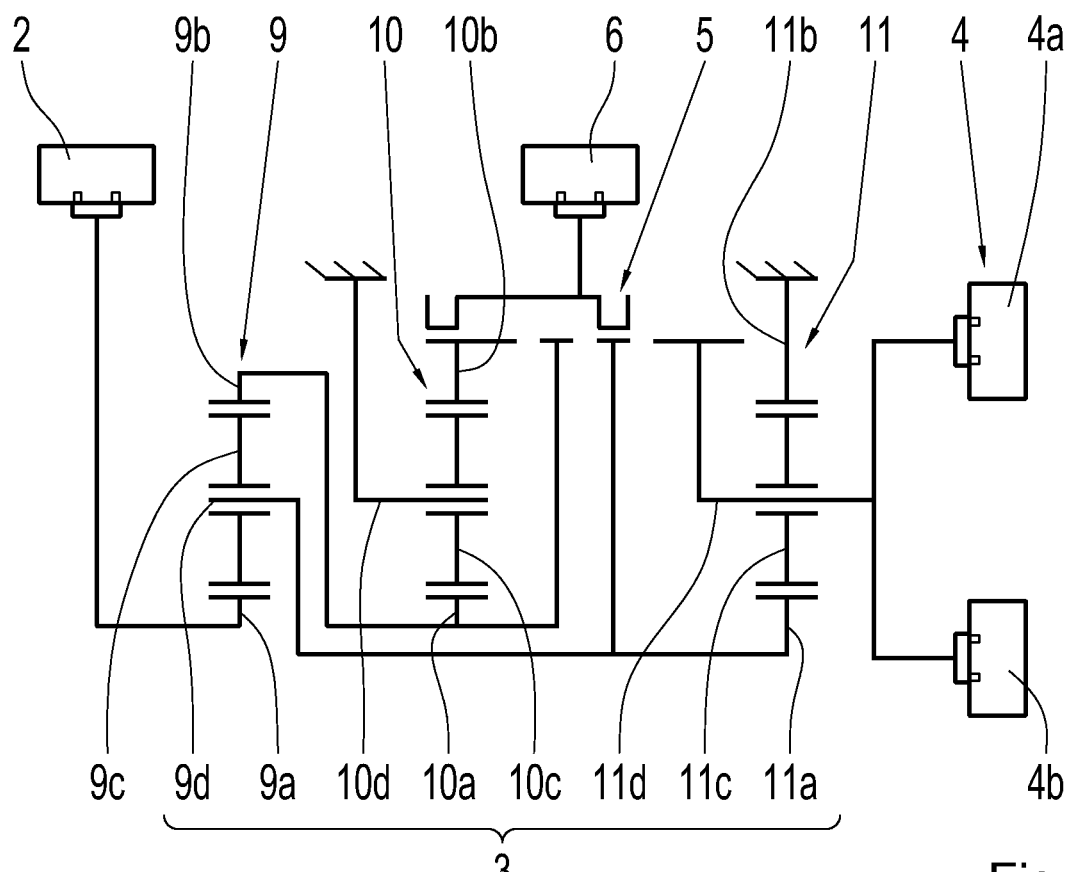
FIG. 2: A more detailed example of a drivetrain scheme of a vehicle in the form of an electric vehicle.

FIG. 2 shows as an example a transmission 3 of an electric vehicle, together with the electric machine 2 which serves as the drive unit, and together with the drive output 4, wherein in FIG. 2, as the drive output 4 two driven wheels 4a and 4b of a driven axle are shown. The transmission 3 in FIG. 2 comprises three planetary gearsets 9, 10, and 11. Of those planetary gearsets 9, 10, 11 respective sun gears 9a, 10a, and 11a, ring gears 9b, 10b, and 11b, planetary gearwheels 9c, 10c, and 11c, and webs 9d, 10d, and 11d are shown, which are interconnected with one another in the manner shown in FIG. 2.

According to FIG. 2, the electric machine 2 that serves as the drive unit drives the sun gear 9a of the planetary gearset 9. The drive output 4 is engaged with the web 11d of the planetary gearset 11.

In addition, FIG. 2 shows an interlocking shifting element 5, which can be actuated by the electric actuator 6 in order to change it between different shifting positions.

In the shifting position shown in FIG. 2 the interlocking shifting element 5 connects the ring gear 10b of the planetary gearset 10 to the sun gear 11a of the planetary gearset 11. By moving the shifting element halves of the interlocking shifting element 5, the interlocking shifting element 5 can be changed from the shifting position shown in FIG. 2 to a shifting position in which the interlocking shifting element 5 couples the sun gear 10a of the planetary gearset 10 to the web 11d of the planetary gearset 11.

The invention is now concerned with how to determine the shifting position of an interlocking shifting element 5 of a transmission 3 of a vehicle in a simple and reliable manner.

According to the invention, the strength of the electric current of the electric actuator 6 functionally connected to the interlocking shifting element 5 is detected and, depending on the strength of the electric current of the electric actuator 6, a conclusion is reached about the shifting position of the interlocking shifting element 5 actuated by the electric actuator 6.

When an electric current strength through the element actuator 6 is determined and found to be greater than a limit value stored, or to be stored in the control unit, it is concluded that the shifting position of the interlocking shifting element is either a tooth-on-tooth position or an end position of the interlocking shifting element 5. When in a tooth-on-tooth position or in an end position, the shifting element halves 5a, 5b do not move any further despite the fact that the actuator 6 is energized, the electric current strength increases because there is no longer any electrical induction.

In particular, it is provided that after the beginning of the activation of the interlocking shifting element 5 by the electric actuator 6 a timer is started, and the time interval that passes after the beginning of the activation of the interlocking shifting element 5 by the electric actuator 6 is detected.

If it is recognized that the current strength through the electric actuator is or will be larger than the said limit value before the lapse of a predetermined time interval since the beginning of the activation of the interlocking shifting element 5 by the electric actuator 6, then it is concluded that the shifting position of the interlocking shifting element 5 is a tooth-on-tooth position.

On the other hand, if it is found that the strength of the electric current in the electric actuator 6 is or will be larger than the corresponding limit value only after the lapse of the predetermined defined time interval stored in the control unit since the beginning of the activation of the interlocking shifting element 5 by the electric actuator 6, then it is concluded that the shifting position of the interlocking shifting element 5 is an end position.

The above determination of the shifting position of the interlocking shifting element 5 does not require a position sensor.

The method can also be used to verify the shifting position determined by a position sensor.

The invention also relates to a control unit which is designed to carry out the above-described method automatically. The control unit according to the invention is in particular a transmission control unit 7.

Such a transmission control unit 7 is in the form of an electronic control unit and comprises hardware means and software means for implementing the method according to the invention.

The hardware means include data interfaces in order to exchange data with the assemblies involved in carrying out the method according to the invention, for example with the electric actuator 6 of the transmission 3. The hardware means also include a processor for data processing and a memory for data storage.

The software means include program modules which are implemented in the control unit for carrying out the method according to the invention.

The control unit according to the invention is designed to detect the strength of the electric current through an electric actuator 6 of an interlocking shifting element 5 and, depending on the strength of the electric current through the electric actuator 6, to determine a shifting position if the interlocking shifting element 5.

In particular, the control unit is designed, at the beginning of the activation of the interlocking shifting element 5 by the actuator 6, to start a timer and to determine the time that passes since the said beginning of the activation of the interlocking shifting element 5 by the actuator 6.

This time passed since the beginning of activation is compared with a time interval predetermined by the control unit, and the electric current strength is also compared with the limit value predetermined by the control unit.

If the control unit detects that the electric current strength in the element actuator 6 is or will be greater than the corresponding limit value before the lapse of the defined time interval predetermined by the control unit since the beginning of the activation of the interlocking shifting element 5 by the electric actuator 6, then the control unit concludes that the interlocking shifting element 5 is in a tooth-on-tooth position.

On the other hand, if the control unit finds that the electric current strength through the actuator 6 is or will be greater than the corresponding limit value only after the lapse of the defined time interval since the beginning of the activation of the interlocking shifting element 5 by the electric actuator 6, then the control unit concludes that the interlocking shifting element 5 is in an end position.

In addition, the invention relates to a transmission 3 with a control unit 7 according to the invention and to a vehicle with such a transmission 3. The vehicle is preferably an electric vehicle, i.e., a fully electric motor vehicle.

INDEXES

1 Drivetrain
2 Electric machine
3 Transmission
4 Drive output
4a Wheel
4b Wheel
5 Interlocking shifting element
5a Shifting element half
5b Shifting element half
6 Electric actuator
7 Transmission control unit
8 Motor control unit
9 Planetary gearset
9a Sun gear
9b Ring gear
9c Planetary gearwheel
9d Web
10 Planetary gearset
10a Sun gear
10b Ring gear
10c Planetary gearwheel
10d Web
11 Planetary gearset
11a Sun gear
11b Ring gear
11c Planetary gearwheel
11d Web

The invention claimed is:

1. A method for operating an interlocking shifting element of a transmission of a vehicle, wherein the interlocking shifting element has shifting element halves configured to be moved relative to one another when opening and closing the interlocking shifting element, and wherein an electric actuator is configured to bring about the relative movement between the shifting element halves when opening and/or closing the interlocking shifting element, the method comprising:
   determining an electric current strength through the electric actuator; and
   determining, based on the electric current strength through the electric actuator, a shifting position of the interlocking shifting element.

2. The method according to claim 1, comprising:
   determining that the electric current strength through the electric actuator is larger than a limit value; and
   determining, based on the electric current strength, that the shifting position of the interlocking shifting element is either a tooth-on-tooth position or an end position of the interlocking shifting element.

3. The method according to claim 2, comprising:
   determining that the electric current strength through the electric actuator is larger than the limit value before a lapse of a predefined time interval since a beginning of activating the interlocking shifting element by the electric actuator; and
   determining, based on the electric current strength exceeding the limit value before the lapse of the predefined time interval, that the shifting position is the tooth-on-tooth position of the interlocking shifting element.

4. The method according to claim 2, comprising:
   determining that the electric current strength through the electric actuator is larger than the said limit value after a lapse of a predefined time interval since the beginning of activating the interlocking shifting element; and
   determining, based on the lapse of the predefined time interval, that the shifting position of the interlocking shifting element is the end position of the interlocking shifting element.

5. A control unit of a vehicle, the control unit configured to bring about a relative movement between shifting element halves of an interlocking shifting element by activating an electric actuator in order to open and/or close an interlocking shifting element of a transmission, and further configured to detect an electric current strength through the electric actuator and, depending on the electric current strength through the electric actuator, to determine a shifting position of the interlocking shifting element.

6. The control unit of claim 5, wherein the control unit comprises a transmission control unit.

7. The control unit according to claim 6, wherein the control unit is further configured to determine whether the electric current through the electric actuator is larger than a limit value, and to determine whether the shifting position of the interlocking shifting element is a tooth-on-tooth position or an end position of the interlocking shifting element based on the electric current through the electric actuator.

8. The control unit according to claim 7, wherein the control unit is further configured to determine, based on the electric current through the electric actuator being greater than the limit value before a lapse of a predefined time interval since a beginning of actuating the interlocking shifting element by the electric actuator, that the shifting position of the interlocking shifting element is a tooth-on-tooth position of the interlocking shifting element.

9. The control unit according to claim 7, wherein the control unit is further configured to determine, based the electric current through the electric actuator being greater than the said limit value only after a lapse of a predefined time interval since a beginning of actuating the interlocking shifting element by the electric actuator, that the shifting position of the interlocking shifting element is an end position of the interlocking shifting element.

10. A transmission of a vehicle, comprising a control unit according to claim 5.

11. A vehicle comprising a transmission according to claim 10.

12. The vehicle of claim 11, wherein the vehicle is an electric vehicle.

\* \* \* \* \*